(12) United States Patent  
Shigenaga (10) Patent No.: US 8,084,676 B2  
(45) Date of Patent: Dec. 27, 2011

(54) DISTAL STRUCTURE OF LEG FOR MUSICAL INSTRUMENT STAND

(75) Inventor: Fumihiro Shigenaga, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 12/652,060

(22) Filed: Jan. 5, 2010

(65) Prior Publication Data

US 2010/0186574 A1 Jul. 29, 2010

(30) Foreign Application Priority Data

Jan. 23, 2009 (JP) ................ 2009-012796

(51) Int. Cl.  
 *G10D 13/02* (2006.01)
(52) U.S. Cl. ...................................................... 84/421
(58) Field of Classification Search .......... 84/327, 84/329, 421; 248/188, 188.8  
See application file for complete search history.

(56) References Cited

U.S. PATENT DOCUMENTS

| 6,031,170 A | 2/2000 | Hoshino |
| 7,371,953 B2 | 5/2008 | Takegawa |
| 2005/0109898 A1 * | 5/2005 | Hsieh ..................... 248/188.9 |

* cited by examiner

*Primary Examiner* — Kimberly Lockett  
(74) *Attorney, Agent, or Firm* — Dickstein Shapiro LLP (57) ABSTRACT

The distal structure of a leg for a musical instrument stand is constituted of a spike member installed inside the storage of a case having a ground portion whose ground surface is placed on the floor, a rotor interconnected to the spike member, and a single operator projected above the case. Upon a first depression, a presser of the operator depresses a projection of the rotor downward so that the spike member protrudes from the ground surface. In the protruded state of the spike member, the projection of the rotor is engaged with a receptor formed in a stepped interior of the storage. Upon a second depression, the presser of the operator depresses the projection of the rotor again so as to release the engagement between the projection and the receptor, so that the spike member moves to retract inside the storage of the case.

5 Claims, 9 Drawing Sheets

DISTAL STRUCTURE OF LEG FOR MUSICAL INSTRUMENT STAND

BACKGROUND OF THE INVENTION

1. Field of the Invention

The present invention relates to distal structures of legs for musical instrument stands and in particular to mechanisms for protruding and retracting spike members from lower ends of legs.

The present application claims priority on Japanese Patent Application No. 2009-12796, the content of which is incorporated herein by reference.

2. Description of the Related Art

Musical instrument stands for supporting musical instruments at desired heights, such as stands for supporting drums and cymbals, have been widely used and each constituted of a plurality of legs placed on the ground or floor, a support rod which is vertically elongated and interconnected with the legs, and a holding member which is attached to the upper end of the support rod so as to hold a musical instrument. For example, Patent Documents 1 and 2 disclose stands which are equipped with spike members at distal ends of legs for the purpose of stability in an upright position.

Patent Document 1: U.S. Pat. No. 6,031,170
    Patent Document 2: U.S. Pat. No. 7,371,953

FIG. 4 of Patent Document 1 (not used in this application) shows that a bolt is inserted in a slot and interconnected to a spike member. Loosening and moving the bolt in the extending direction of the slot allow the distal end of the spike member to protrude or retract from the lower end of a leg placed on the floor.

FIG. 2 of Patent Document 2 (not used in this application) shows a spike member which is rotatably interconnected to a leg via a bolt. Loosening the bolt allows the spike member to rotate so that the distal end of the spike member can protrude or retract from the lower end of the leg placed on the floor.

FIG. 5 of Patent Document 2 (not used in this application) shows two buttons allowing the spike member to protrude and retract from the lower end of the leg. That is, one button is operated to make the spike member protrude from the lower end of the leg, while another button is operated to make the spike member retract from the lower end of the leg.

The foregoing structures shown in FIG. 4 of Patent Document 1 and FIG. 2 of Patent Document 2 require troublesome operation in which every time the spike member is operated to protrude and retract from the lower end of the leg, the bolt must be loosened and tightened again, and the spike member must be moved or rotated. This is a complicated and time-consuming operation for a player or user operating the spike member to protrude or retract from the lower end of the leg, which in turn causes a substantial load for him/her in setting the stand holding a musical instrument at a desired position.

In the foregoing structure shown in FIG. 5 of Patent Document 2, a player or user may be confused as to which of two buttons must be operated to protrude or retract the spike member from the lower end of the leg; and this increases a load for him/her in operating the spike member. In addition, two buttons lead to a complex structure for protruding and retracting the spike member from the lower end of the leg.

SUMMARY OF THE INVENTION

It is an object of the present invention to provide a simple distal structure of a leg for a musical instrument stand, allowing a player or user to easily protrude or retract a spike member from the lower end of a leg placed on the floor.

The present invention is directed to a distal structure of a leg for a musical instrument stand which supports a musical instrument such as a drum and cymbal at a desired height. The distal structure of the leg is constituted of a case having a ground portion which is attached to the lower portion of the leg and whose ground surface is placed on the floor, a spike member which is installed inside the ground portion of the case and which is protruded or retracted from the ground surface, an operator which forces to the spike member to move vertically, and a switch interposed between the spike member and the operator. The switch maintains the spike member protruded from the ground surface upon a first depression of the operator. Then, the switch releases the spike member to be retracted inside the ground portion of the case upon a second depression of the operator.

In the above, the switch inhibits the spike member from moving upward in a protruded state established upon the first depression of the operator. In addition, the switch releases the spike member to be restored in a retracted state upon the second depression of the operator.

In connection with the switch, a presser of the operator presses a projection of a rotor attached to the spike member stored inside a storage of the case; the projection of the rotor is engaged with a receptor aligned at a prescribed position of a stepped interior of the storage; and the vertical movement of the spike member is limited by the engagement between the projection and the receptor in the protruded state established after the first depression of the operator, while the spike member is released from the engagement between the projection and the receptor upon the second depression of the operator so that the spike member is restored in the retracted state.

The above switch allows the spike member to protrude or retract from the ground surface upon simple depression of the operator. The present invention does not need the troublesome operation for repeatedly loosening and tightening bolts used in prior art and makes it possible to perform the protrusion/retraction operation of the spike member and the setting operation of a musical instrument in a short period of time. Since the present invention requires a single operator which can be easily recognized by the user, it is possible for the user to perform the above operations with ease, and it is possible to simplify the distal structure of a leg compared to the conventional structure using multiple buttons.

In addition, the present invention implements the "simple" switching mechanism including the presser of the operator, the projection of the rotor attached to the spike member, and the receptor aligned in the stepped interior of the storage of the case, allowing the spike member to easily protrude and retract from the ground surface upon simple depression of the "single" operator.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

Figure 1:
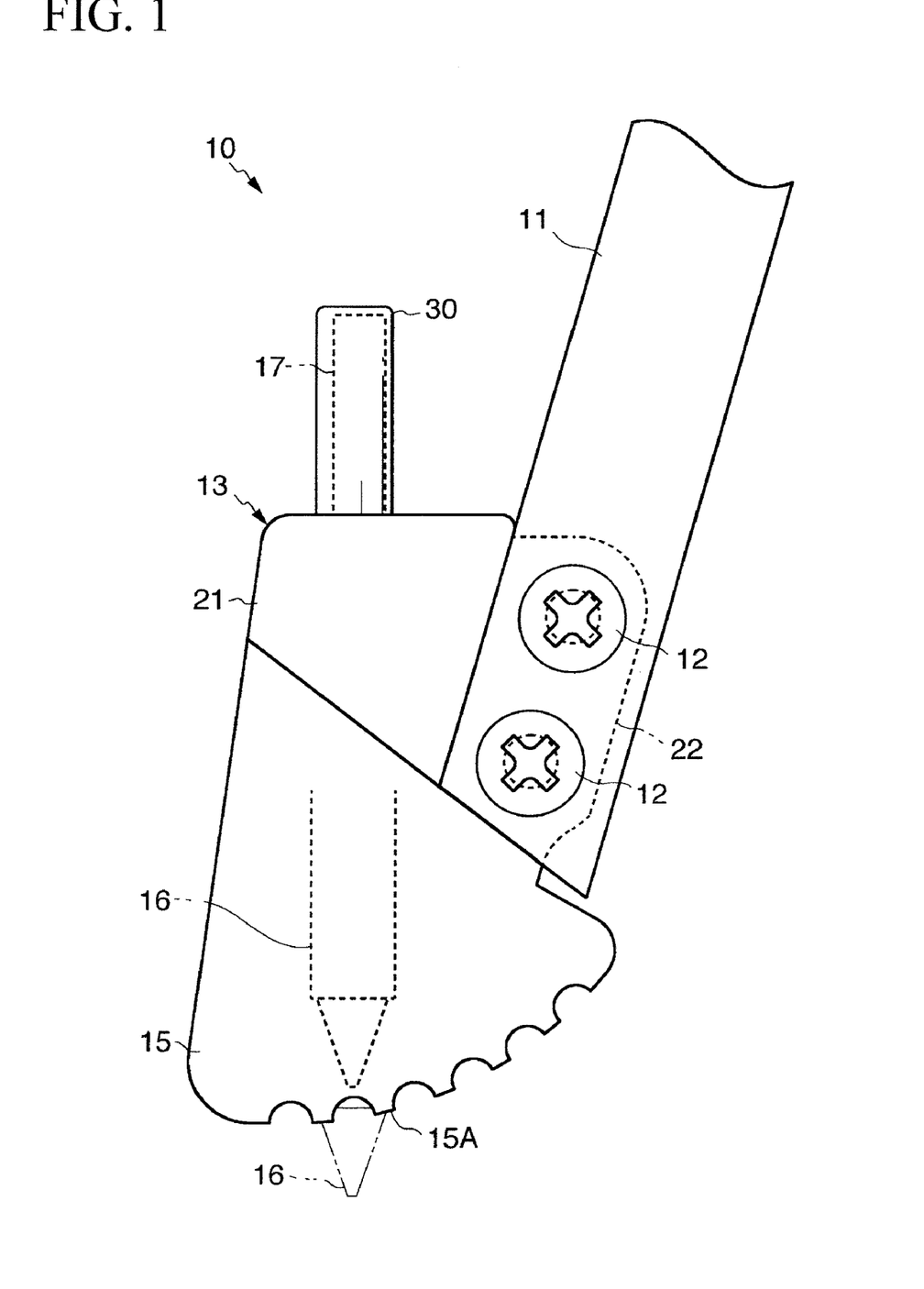
FIG. 1 is a side view partly in cross section showing essential parts included in a distal structure of a leg according to a preferred embodiment of the present invention.
Figure 2:
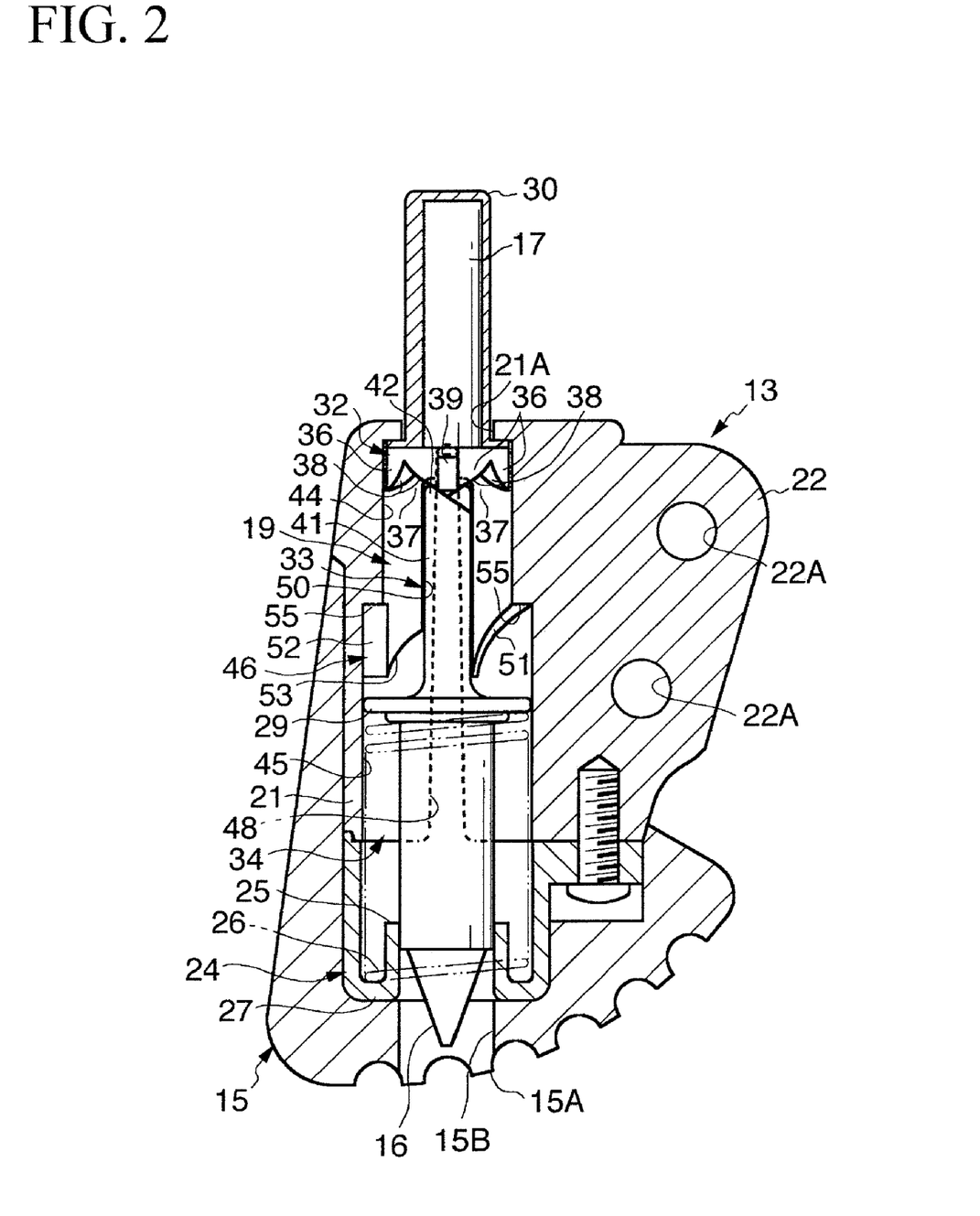
FIG. 2 is a longitudinal sectional view showing a retracted state in which a spike member is retracted from the lower end of the leg.
Figure 3A:
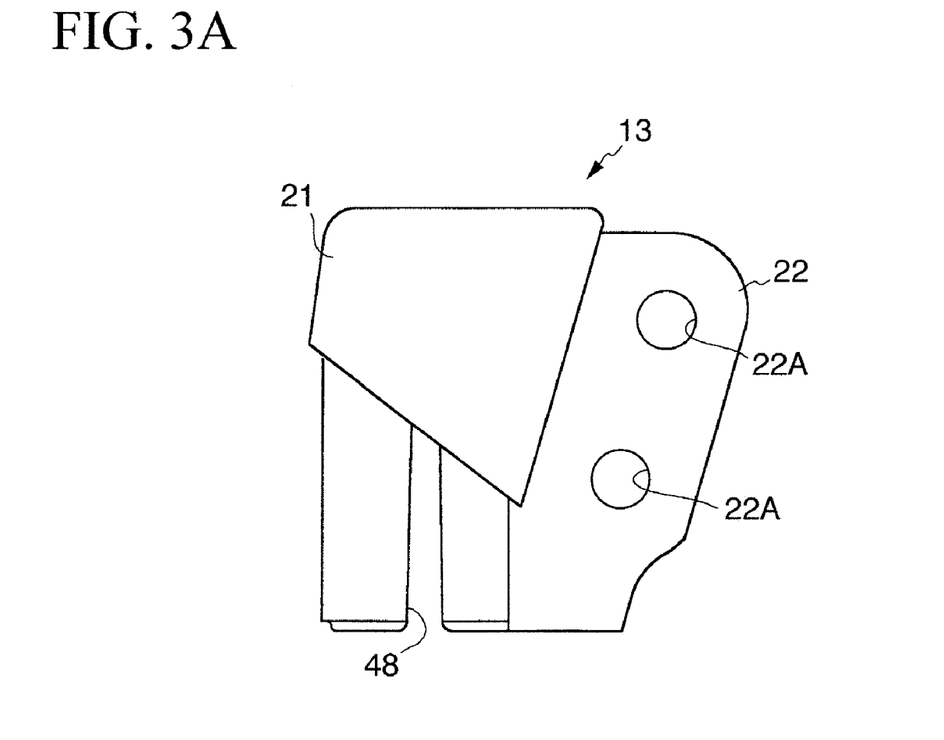
FIG. 3A is a side view of a case attached to a leg frame of the leg.
Figure 3B:
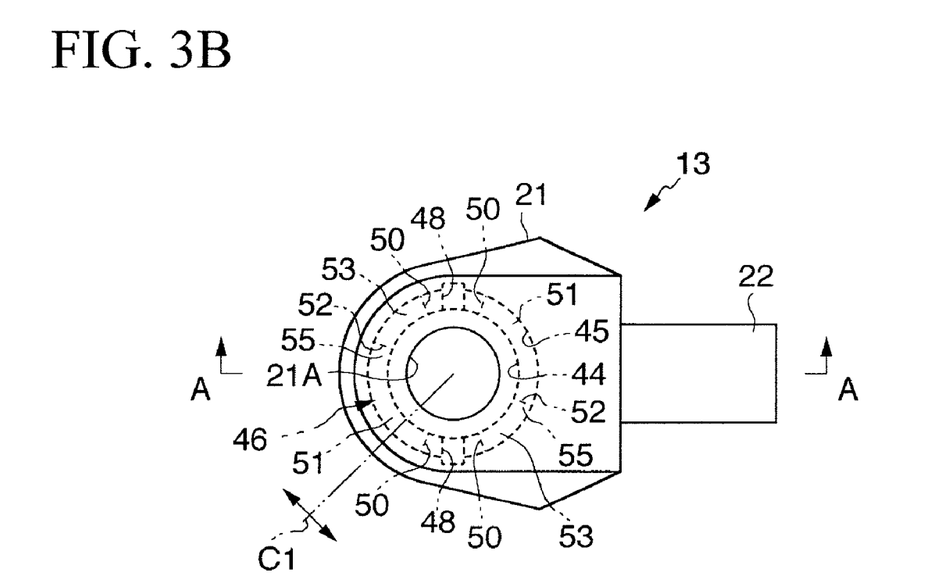
FIG. 3B is a plan view partly in cross section of the case.

FIG. 1 is a side view showing essential parts included in a distal structure of a leg 10 according to a preferred embodiment of the present invention. FIG. 2 is a partial cross-sectional view of the distal structure of the leg 10. The leg 10 shown in FIGS. 1 and 2 is adapted to a musical instrument stand for supporting a musical instrument such as a drum and cymbal at a desired height and is interconnected to the lower end of a support rot (not shown). The leg 10 is constituted of a leg frame 11 whose base portion is interconnected to the support rod, a case 13 which is interconnected to the distal end of the leg frame 11 via screws 12, a ground portion 15 which forms the lower portion of the case 13 placed on the floor, a spike member 16 which is stored inside the case 13 and the ground portion 15, a single operator 17 which projects from the upper end of the case 13, and a switch 19 which is disposed between the spike member 16 and the operator 17.

Details of the case 13 are shown in FIGS. 3A, 3B and FIGS. 4A, 4B, wherein the case 13 is constituted of a main unit 21 (including a storage which will be described later), and an interconnection member 22 which is interconnected to the right-side of the main unit 21 and which has two holes 22A. A hole 21A allowing for the insertion of the operator 17 therethrough is formed in the upper end of the main unit 21. A cover 24 (see FIG. 2) is attached to the lower end of the interconnection member 22 via a screw, thus covering the lower surface of the case 13. The cover 24 is constituted of a cylinder 25 which guides the up/down movement of the spike member 16 inserted therein, and a spring bearing 27 which is interconnected to the lower external circumference of the cylinder 25 so as to support the lower end of a spring 26. The spring 26 is a coiled spring allowing for the insertion of the spike member 16 therethrough.

The ground portion 15 is positioned as the lower portion of the leg 10 so as to receive therein the lower portion of the cover 24 as well as the front-side, back-side, and left-side of the lower portion of the cover 13. The lower surface of the ground portion 15 serves as a ground surface 15A having small irregularities or dimples demonstrating a non-slip ability thereof. The ground surface 15A of the ground portion 15 is actually placed on the floor. A hole 15B runs through the ground surface 15A so as to store the distal end of the spike member 16 therein.

The spike member 16 is formed in an axial shape having a tapered distal end, wherein it can protrude and retract from the ground surface 15A by the up/down movement in an axial direction. A flange 29 is attached to the upper end of the spike member 16. The spring 26 interposed between the spring bearing 27 and the flange 29 exerts resilient force on the flange 29, which is normally pressed upwardly.

Figure 5A:
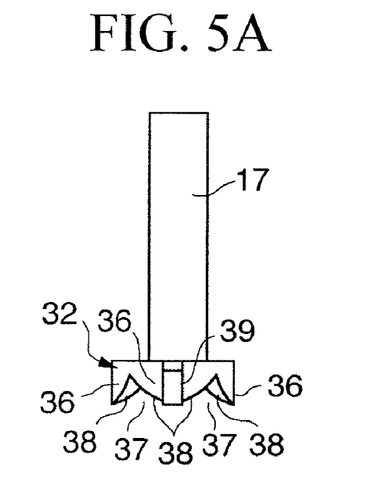
FIG. 5A is a side view showing an operator and a presser which are attached to the case.
Figure 5B:
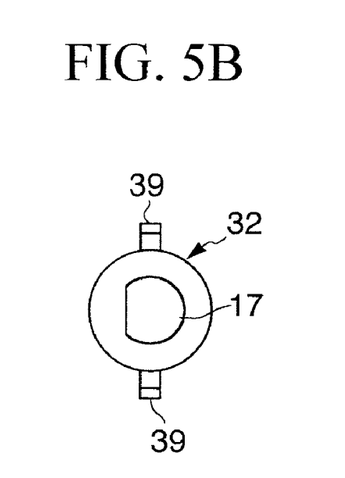
FIG. 5B is a plan view of the operator and the presser.
Figure 5C:
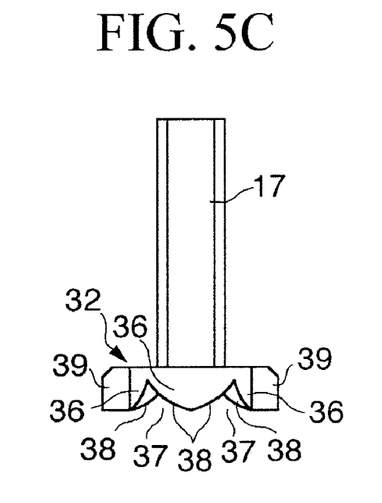
FIG. 5C is a left-side view of the operator and the presser shown in FIG. 5A.
Figure 5D:
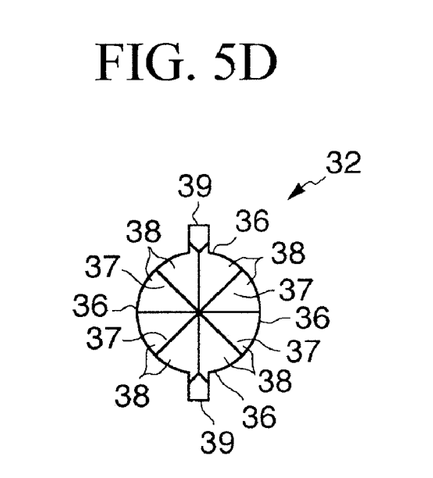
FIG. 5D is a bottom view showing the lower surface of the presser having convexes and concaves alternately aligned in a radial direction.

The operator 17 is an axially-shaped button which is vertically elongated and is covered with a button cover 30 on the external circumference thereof. The cross section of the operator 17 has a circular shape which is partially truncated (see FIG. 5B). The operator 17 is engaged with the internal surface of the button cover 30, thus regulating the relative rotary movement of the operator 17 and the button cover 30. The lower end of the operator 17 is inserted into the hole 21A of the main unit 21 of the case 13, while the upper end of the operator 17 can be depressed by a player's finger.

The switch 19 is constituted of a presser 32 which is interconnected to the lower end of the operator 17, a rotor 33 which is interconnected to the upper surface of the flange 29 in connection with the lower surface of the presser 32, and a storage 34 which is formed inside the main unit 21 with an opening thereunder and which stores the presser 32 and the rotor 33 therein. The switch 19 in plan view is shaped like a point-symmetry structure with respect to the axis of the spike member 16.

As shown in FIGS. 5A to 5D, the presser 32 is formed in a disk shape in which convexes 36 and concaves 37 are alternately formed in the lower surface in a circumferential direction. Specifically, the convexes 36 and the concaves 37 are circumferentially aligned with an angular spacing of 90° therebetween, wherein they are distinguished by paired slopes 38. The convexes 36 are each broadened (upwardly) toward their bases, while the concaves 36 are each broadened (downwardly) toward their openings. A pair of tabs 39 which project in a radial direction of the presser 32 is formed with the convexes 36 positioned at the upper-side and lower-side of the presser 32 shown in FIG. 5D.

Figure 6A:
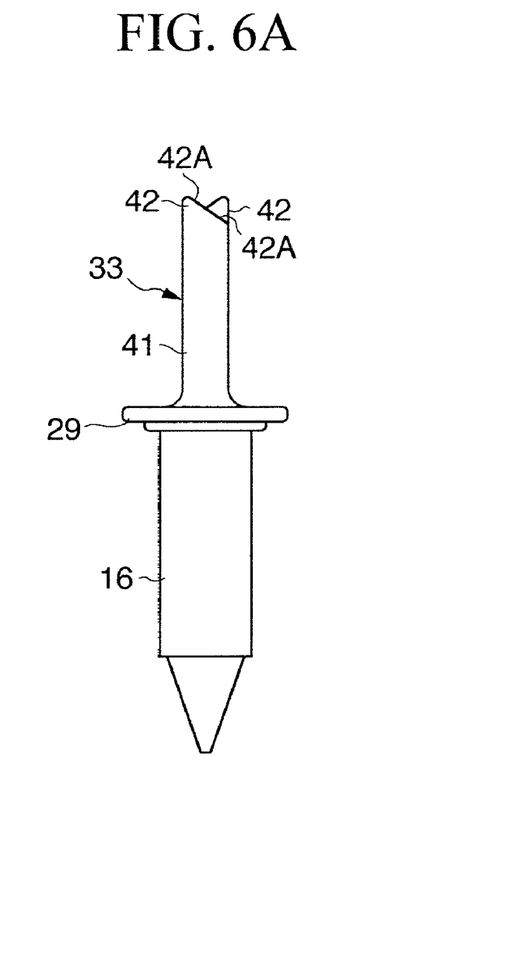
FIG. 6A is a side view showing the spike member equipped with a flange and a rotor which are inserted into the case.
Figure 6B:
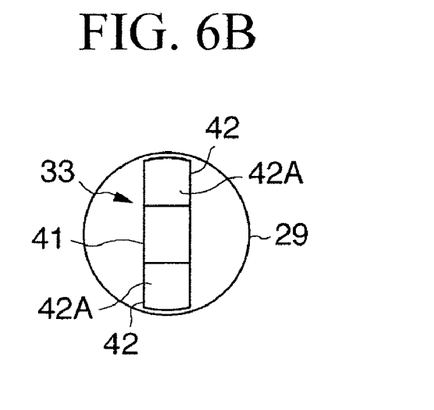
FIG. 6B is a plan view showing the rotor and the flange.
Figure 6C:
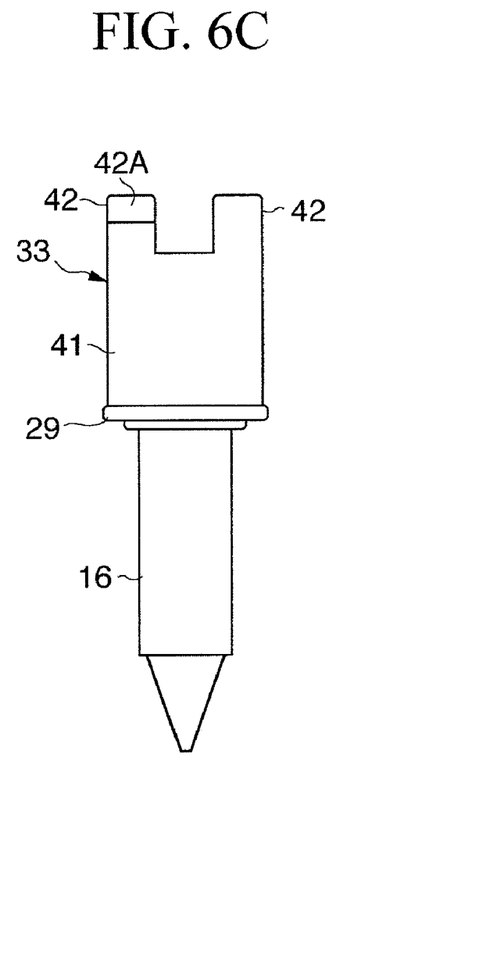
FIG. 6C is a left-side view showing the spike member, the flange, and the rotor shown in FIG. 6A.

As shown in FIGS. 6A to 6C, the rotor 33 is attached to the spike 16 in a rotatable manner in a circumferential direction and is constituted of a planar portion 41 which is vertically disposed on the upper surface of the flange 29, and a pair of projections 42 which are interconnected to the left-side and right-side of the upper end of the planar portion 41 (see FIG. 6C). Each of the projections 42 has slide surfaces 42A which come in contact with the slopes 38 of the presser 32. As shown in FIG. 2 and FIG. 6A, the slide surfaces 42A are inclined along the slopes 38 in such a way that the slide surfaces 42A of the projection 42 in side view are aligned in a left-right symmetrical manner.

Figure 4A:
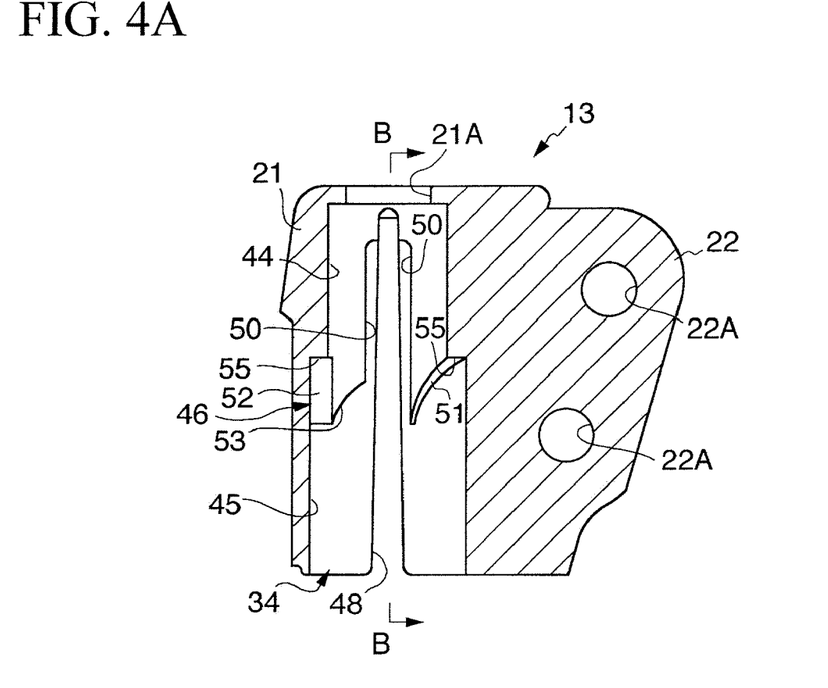
FIG. 4A is a longitudinal sectional view taken along line A-A in FIG. 3B.
Figure 4B:
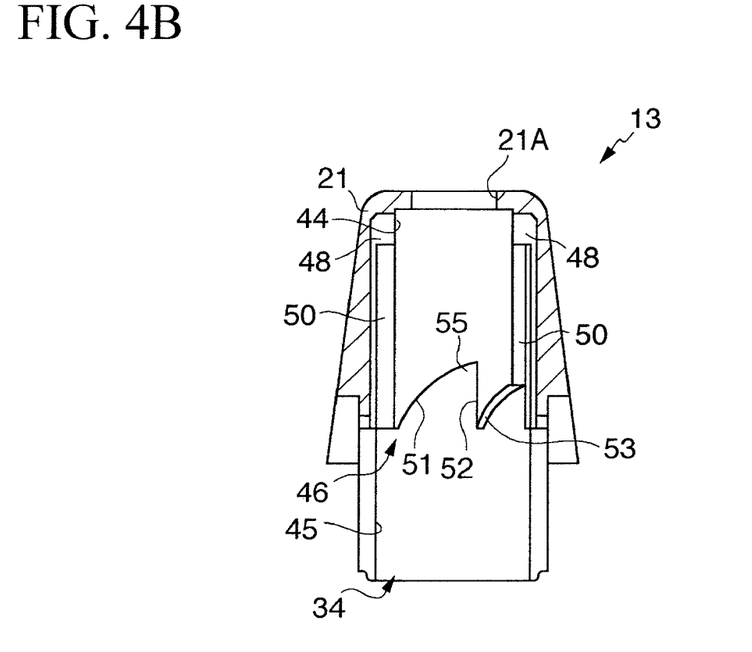
FIG. 4B is a longitudinal sectional view taken along line B-B in FIG. 4A.

As shown in FIGS. 4A and 4B, the storage 34 of the case 13 is interconnected to the hole 21A and is constituted of a small-diameter cavity 44 whose internal diameter is slightly larger than the external diameter of the rotor 33, a large-diameter cavity 45 which is formed below the small-diameter cavity 44 and whose internal diameter is slightly larger than the external diameter of the flange 29 and the "horizontal" width of the planar portion 41, and stepped interiors 46 which are interposed between the small-diameter cavity 44 and the large-diameter cavity 45. Guide channels 48 are formed along the storage 34 at opposite positions and are vertically elongated to receive the tabs 39 of the presser 32. This allows the presser 32 to vertically move along the storage 34 while the tabs 39 are guided by the guide channels 48; and this also regulates the rotation of the presser 32 in the circumferential direction.

Figure 7:
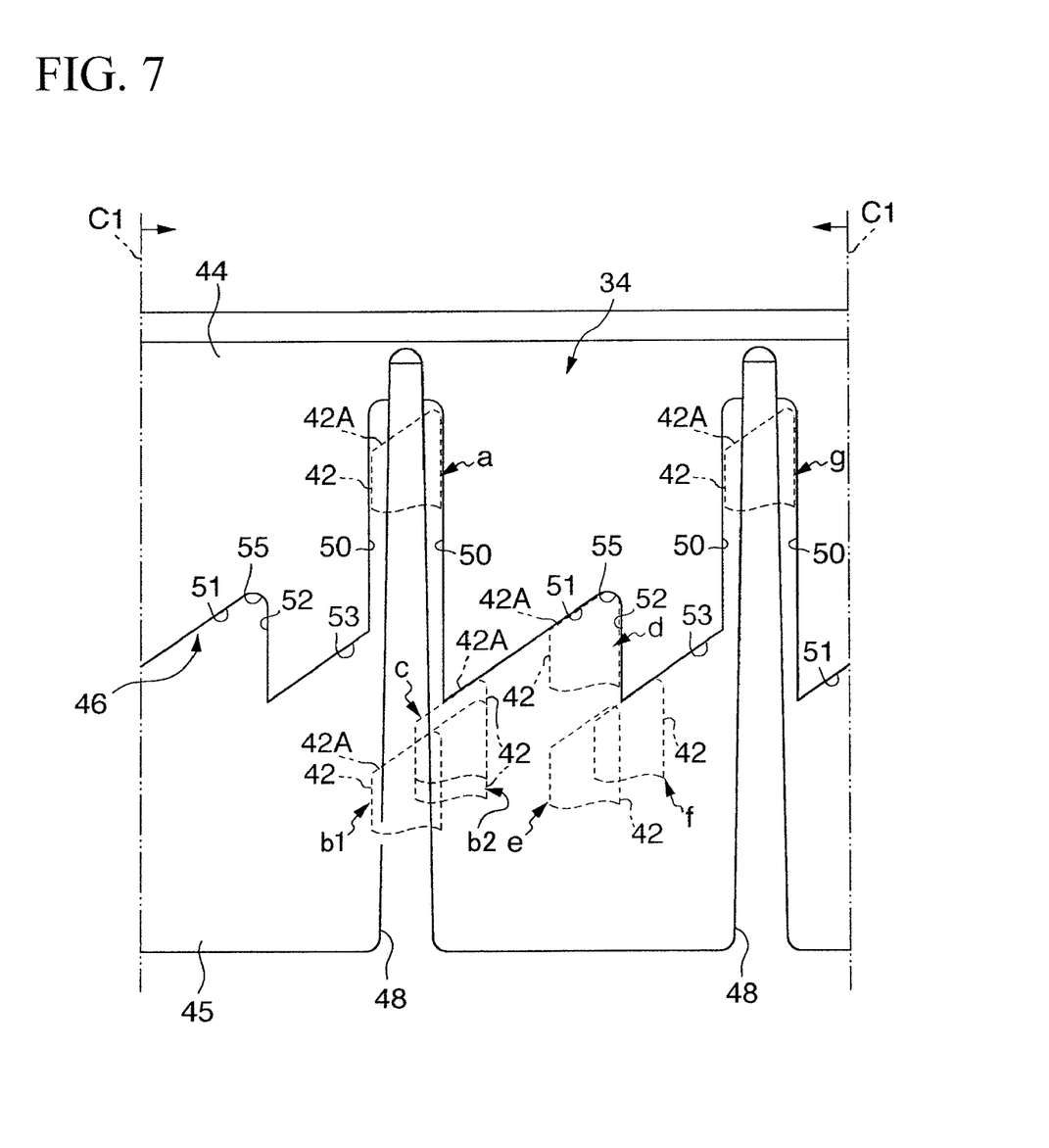
FIG. 7 is an interior development partially showing a storage of the case including the rotor with respect to line C1 in FIG. 3B.

As shown in FIG. 7 in conjunction with FIG. 2, FIG. 3B, and FIGS. 4A, 4B, each of the stepped interiors 46 is constituted of parallel edges 50 which are formed on the left and right sides of each guide channel 48 with a horizontal distance (or a width) slightly larger than the thickness of the planar portion 41 and the thickness of the projection 42, a first inclined edge 51 which is drawn upwardly from the lower end of the right-side parallel edge 50, a vertical edge 52 which is drawn downwardly from the upper end of the first inclined edge 51, and a second inclined edge 53 which is drawn upwardly from the lower end of the vertical edge 52. The stepped interiors 46, each of which includes the parallel edges 50, the first inclined edge 51, the vertical edge 52, and the second inclined edge 53, are aligned with an angular spacing of 180° in the circumferential direction of the interior of the storage 34. That is, the second inclined edge 53 of one stepped interior 46 is connected to the left-side parallel edge 50 of another stepped interior 46. As shown in FIG. 2, the parallel edges 50 of the stepped interiors 46 receive both sides of the rotor, thus regulating the rotation of the rotor 33 in the circumferential direction. A receptor 55 is formed at the intersecting position between the first inclined edge 51 and the vertical edge 52 and is engaged with the projection 42. That is, the projection 42 and the receptor 55 are combined together to form an engagement portion between the rotor 33 and the storage 34 of the case 13.

Figure 8:
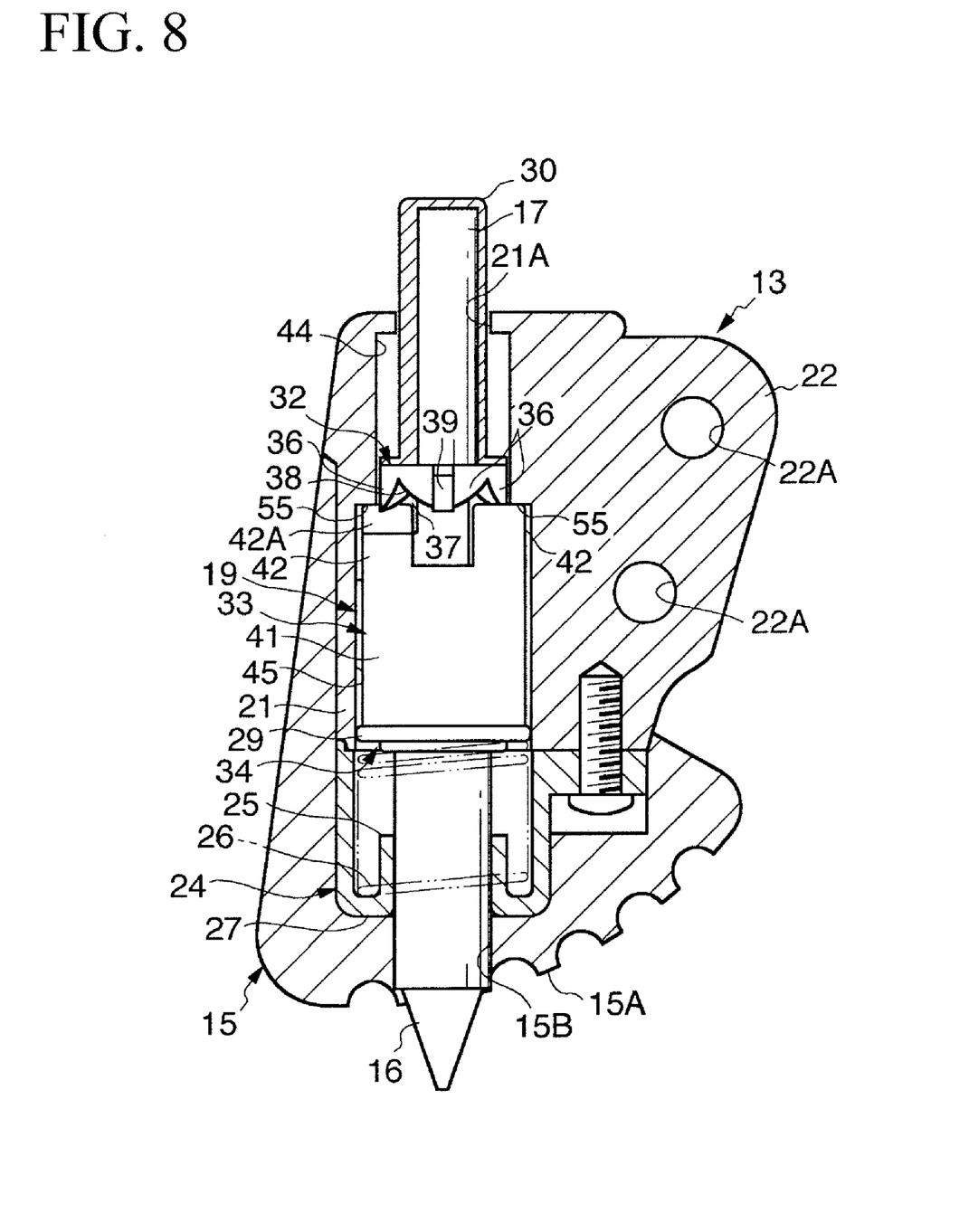
FIG. 8 is a longitudinal sectional view showing a protruded state in which the spike member is protruded from the lower end of the leg.

When a player or user depresses the upper end of the operator 17 downwardly, the distal structure of the leg 10 is changed from a retracted state of FIG. 2 in which the spike member 16 is retracted inside the ground portion 15 of the case 13 to a protruded state of FIG. 8 in which the distal end of the spike member 16 is protruded from the ground surface 15A of the ground portion 15. When the player depresses the operator 17 again in the protruded stage of FIG. 8, the distal end of the spike member 16 is retracted inside the ground portion 15 of the case 13, thus restoring the retracted state of FIG. 2. As described above, the present embodiment allows the player to easily protrude and retract the spike member 16 from the ground surface 15A of the ground portion 15 by simply depressing the operator 17.

The following description refers to the operation of the switch 19 in conjunction with the moving trajectory of the projection 42 during the protrusion/retraction of the spike member 16 relative to the stepped interior 46 with reference to FIG. 7.

In the retracted state in which the spike member 16 is retracted inside the ground portion 15 of the case 13, the projection 42 of the planar portion 41 of the rotor 33 (which is attached to the spike member 16 via the flange 29, see FIGS. 6A and 6C) is set to a position "a" in the space defined between the parallel edges 50. When the operator 17 is depressed, the presser 32 is forced to descend down along the small-diameter cavity 44 of the storage 34 of the case 13 against the resilient force of the spring 26 while the guide channels 48 guiding the tabs 39 prevent the presser 32 from rotating. The rotor 33 descends down together with the presser 32 while the planar edges 50 guiding the planar portion 41 prevent the rotor 33 from rotating, thus forcing the spike member 16 to descend down.

Figure 9:
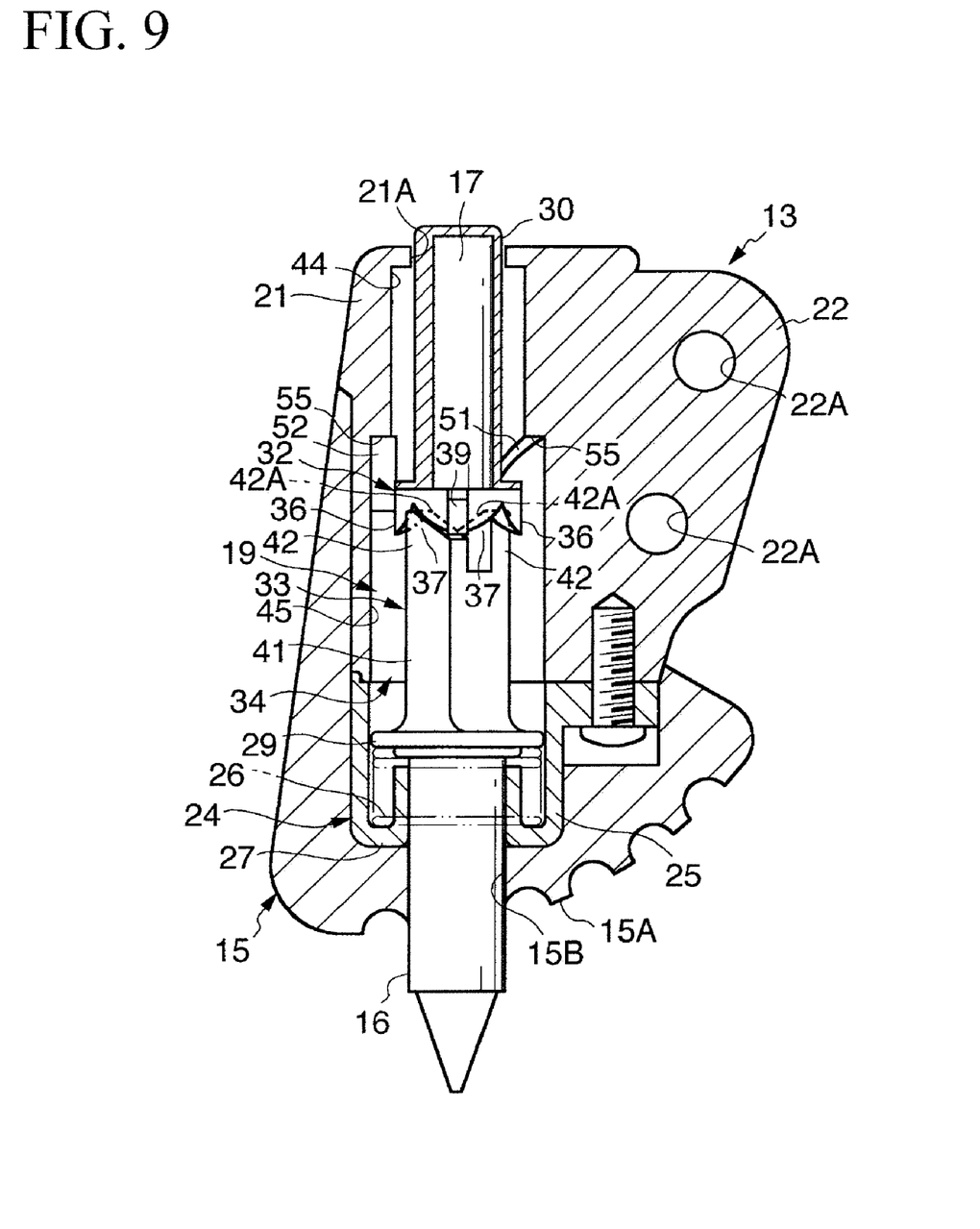
FIG. 9 is a longitudinal sectional view showing an intermediate state established prior to the protruded state of FIG. 8 in conjunction with the retracted state of FIG. 2.

As the rotor 33 and the spike member 16 move further down, the projection 42 descends down to a position "b1" which is lower than the lower end of the space defined between the parallel edges 50. At the lower position b1, the rotor 33 is released from the parallel edges 50 which inhibit the rotor 33 to rotate, so that the rotor 33 starts rotating as the projection 42 which is pressed by the convex 36 of the presser 32 due to the resilient force of the spring 26 is now sliding and guided by the slopes 38 of the presser 32. That is, the spike member 16 is protruded from the ground surface 15A of the ground portion 15 as shown in FIG. 9 while the projection 42 is set to a position "b2" shown in FIG. 7. As the rotor 33 rotates while the projection 42 is guided by the slopes 38 of the presser 32, the rotor 33 ascends upwardly so that the projection 42 is set to a position "c" as the slide surface 42A moves upwardly along the first inclined edge 51.

Weakening or releasing the depression of the operator 17 allows the spike member 16, the rotor 33, and the presser 32 to move upwardly together with the operator 17 due to the resilient force of the spring 26. As the slide surface 42A of the projection 42 is guided by the first inclined edge 51, the rotor 33 ascends upward and further rotates so that the projection comes in contact with the vertical edge 52 at a position "d", at which the projection 42 is engaged with the receptor 55. Due to the engagement of the projection 42 and the receptor 55, it is possible to maintain the protruded state shown in FIG. 8 in which the spike member 16 is protruded from the ground surface 15A of the ground portion 15 of the case 13. That is, the above mechanism inhibits the rotor 33 from further rotating and also inhibits the spike member 16 from further moving upward in a direction in which the distal end of the spike member 16 is retracted inside the ground portion 15.

When a player starts depressing the operator 17 in the protruded state of FIG. 8, the presser 32, the rotor 33, and the spike member 16 descend down against the resilient force of the spring 26 while the vertical edge 52 inhibits the rotor 33 from rotating. Then, the projection 42 is set to a position "e" below the lower end of the vertical edge 52, thus releasing the rotor 33 from the vertical edge 52; hence, the rotor 33 becomes free to rotate. Similar to the movement from the position b2 to the position c, the projection 42 moves from the position e to the position "f" matching the lower end of the second inclined edge 53.

Weakening the depression of the operator 17 allows the rotor 33 (together with the presser 32 and the spike member 16) to ascend upwardly as the slide surface 42A of the projection 42 is guided by the second inclined edge 53. Thereafter, the projection is set to an upper position "g" in the space defined between the "other" parallel edges 50. At this time, the above mechanism releases the engagement of the projection 42 and the receptor 55 so as to restore the retracted state of FIG. 2 in which the distal end of the projection member 16 is stored inside the ground portion 15 of the case 13. Since the switch 19 in plan view is in a point-symmetry structure with respect to the axis of the spike member 16, the guiding of the projection 42 and the engagement of the projection 42 and the receptor 55 are conducted at two opposite positions on the stepped interiors 46 in the radial direction of the spike member 16.

As described above, the present embodiment is designed to establish and release the engagement of the projection 42 and the receptor 55 by simply depressing the operator 17, thus enabling the spike member 16 to protrude or retract from the ground surface 15A. The present embodiment improves the user's handling ability because the present embodiment does not need special tools and troublesome operation but implements a single member (i.e. the operator 17) which allows the spike member 16 to easily and speedily protrude and retract from the ground surface 15A. In result, it is possible to easily perform the operation for adjusting the position and backlash of the leg 10 in a short period of time.

It is possible to rectify the present embodiment in various ways. For example, the present embodiment uses the two projections 42 and receptors 55; but this is not a restriction. It is possible to provide one projection 42 and one receptor 55. Alternatively, it is possible to provide three or more projections 42 and three or more receptors 55.

Lastly, the present invention is not necessarily limited to the present embodiment and its variations, which can be modified in various ways in terms of shapes, positions, and arrangements of components within the scope of the invention as defined in the appended claims.

What is claimed is:

1. A distal structure of a leg for a musical instrument stand, comprising:
    a case having a ground portion which is attached to a lower portion of the leg and whose ground surface is placed on a floor;
    a spike member which is installed inside the ground portion of the case and which is protruded or retracted from the ground surface;
    an operator which forces the spike member to move vertically; and
    a switch interposed between the spike member and the operator, wherein the switch maintains the spike member being protruded from the ground surface upon a first depression of the operator, and the switch releases the spike member to be retracted inside the ground portion of the case upon a second depression of the operator.

2. The distal structure of a leg according to claim 1, wherein the switch inhibits the spike member from moving upward in a protruded state established upon the first depression of the operator, and wherein the switch releases the spike member to be restored in a retracted state upon the second depression of the operator.

3. The distal structure of a leg according to claim 1, wherein, in connection with the switch, a presser of the operator presses a projection of a rotor attached to the spike member stored inside a storage of the case, the projection of the rotor is engaged with a receptor aligned at a prescribed position of a stepped interior of the storage, and the vertical movement of the spike member is limited by the engagement between the projection and the receptor in the protruded state established after the first depression of the operator, while the spike member is released from the engagement between the projection and the receptor upon the second depression of the operator so that the spike member is restored in the retracted state.

4. The distal structure of a leg according to claim 3, wherein, along the stepped interior of the storage of the case in a circumferential direction, a pair of parallel edges is formed to guide the projection of the rotor to vertically move while inhibiting the rotor to rotate in a prescribed distance upon the first depression of the operator, a first inclined edge is formed subsequently to the parallel edge to guide the projection of the rotor to move upward in a first inclined direction as the rotor becomes free to rotate, the receptor is formed subsequently to the first inclined edge and is engaged with the projection of the rotor so as to prevent the projection of the rotor from further moving upward so that the spike member is set to the protruded state, and a vertical edge is formed subsequently to the reception to guide the projection of the rotor to move downward upon the second depression of the operator, and a second inclined edge is formed subsequently to the vertical edge to guide the projection of the rotor to move upward in a second inclined direction as the rotor becomes free to rotate.

5. The distal structure of a leg according to claim 3, wherein at least one pair of a convex and a concave is formed on the lower surface of the presser so that the projection of the rotor is guided to rotate along a slope formed between the convex and the concave.

* * * * *